United States Patent [19]

Thorley

[11] Patent Number: 5,427,685
[45] Date of Patent: Jun. 27, 1995

[54] SEPARATOR FOR SEPARATING GAS FROM A LIQUID

[75] Inventor: Robert J. Thorley, Elworth, Great Britain

[73] Assignee: The Nash Engineering Company, Trumbull, Conn.

[21] Appl. No.: 76,405

[22] Filed: Jun. 14, 1993

[30] Foreign Application Priority Data

Apr. 29, 1993 [GB] United Kingdom ................. 9308866

[51] Int. Cl.⁶ ............................................. B01D 21/26
[52] U.S. Cl. ................................. 210/512.1; 210/787; 96/189; 96/190; 55/337
[58] Field of Search ............... 96/189, 190; 210/512.1, 210/787; 55/459.1–459.4, 337

[56] References Cited

U.S. PATENT DOCUMENTS

| 2,710,071 | 6/1955 | Kinser et al. ........................ 96/184 |
| 3,349,547 | 5/1966 | Hoipkemeier . |
| 3,419,107 | 12/1968 | Jozepaitis ............................ 181/40 |
| 3,731,467 | 5/1973 | Jennings ........................... 55/459.4 |
| 4,464,264 | 8/1984 | Carroll ............................ 210/512.1 |
| 4,539,023 | 9/1985 | Boley ................................. 96/184 |

FOREIGN PATENT DOCUMENTS

| 1003526 | 9/1965 | United Kingdom . |
| 1160388 | 8/1969 | United Kingdom . |
| 1188348 | 4/1970 | United Kingdom . |
| 1270674 | 4/1972 | United Kingdom . |
| 2231818 | 11/1990 | United Kingdom . |

OTHER PUBLICATIONS

"Siemens–System ELMOVAC-F Package Units", Siemens Aktiengesellschaft.
"News from Humboldt Wedag; Fluid ring gas pumps. A complete range that's more competitive than ever", Humboldt Wedag (G.B.) Ltd., Riverside Road London, England.
"Liquid-ring pumps series Alpha/A.L.", Hibon Ltd.
"Rotary liquid sealed oil free vacuum pumps and compressors", Publication No. RVP/2, 3m 64/10, W. Sisson & Co. Ltd., Gloucester, England.
"Compact Package Units; Combination Vacuum Systems", Hick Hargreaves.
"Water-Ring Vacuum Pump Type 2BEI", Fosham Pump Factory.
"New Side/Top Mounted Separators", Hick Hargreaves Update, Summer 1992.

Primary Examiner—Robert A. Dawson
Assistant Examiner—David Reifsnyder
Attorney, Agent, or Firm—Fish & Neave; Robert R. Jackson

[57] ABSTRACT

A separator body 23 has a cylindrical internal surface 24 having an axis A arranged in use substantially horizontally. An inlet 19, 20 for a gas and liquid mixture, and respective outlets 53, 30 are provided in the body 23 for the liquid L and gas. The inlet 19, 20 is arranged such that the mixture leaving the inlet is directed substantially tangentially to the internal surface 24, whereby incoming mixture will travel circumferentially around the surface 24 to cause the liquid and gas to separate by centrifugal action. Catchment means 47 is provided which catches the liquid L travelling around the cylindrical internal surface 24 after separation of gas therefrom so as to direct the liquid toward its outlet 53.

18 Claims, 5 Drawing Sheets

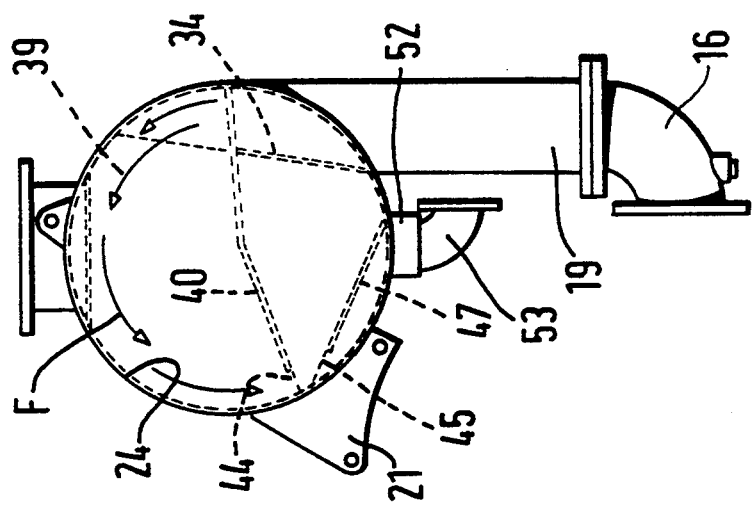

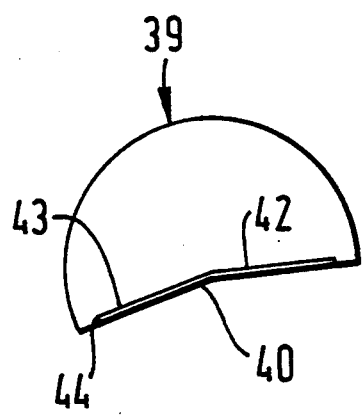
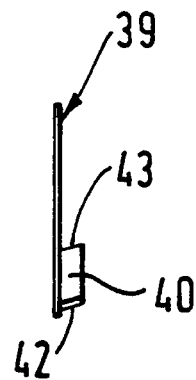
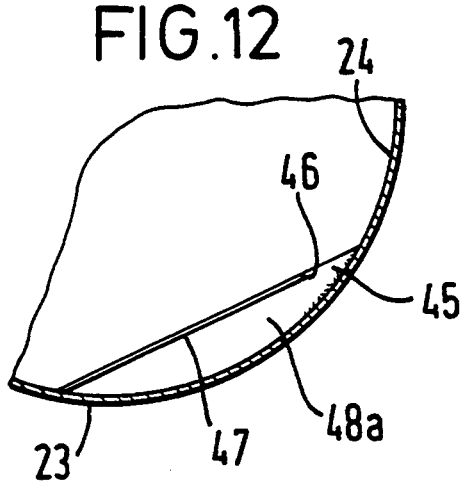
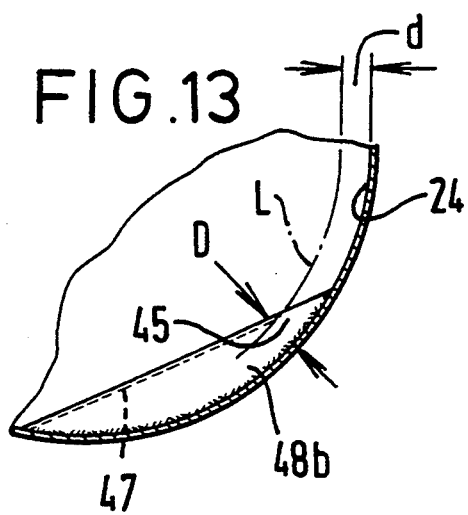
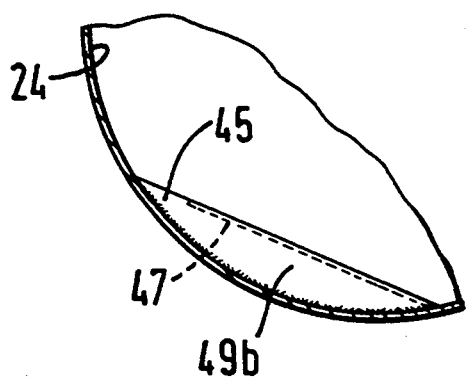
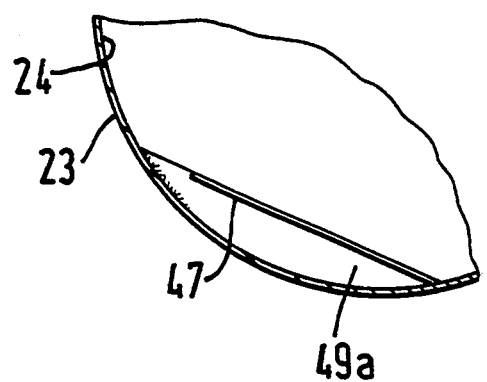

SEPARATOR FOR SEPARATING GAS FROM A LIQUID

BACKGROUND OF THE INVENTION

This invention relates to a separator for separating gas from a liquid and is particularly, but not exclusively, concerned with the separation of gas from a gas and liquid mixture delivered from a liquid ring vacuum pump.

Liquid ring vacuum pumps are well known in the art and comprise a rotor arranged eccentrically within a cylinder which is fed with liquid such as water from a supply. The rotor comprises a series of generally radial blades, and rotation of the rotor causes the liquid to centrifuge outwardly to form a ring of liquid around the inside of the cylinder. Chambers are defined between the inner surface of the ring and a hub of the rotor from which the blades extend due to the eccentric position of the rotor within the housing. Changing volume of the chambers during rotation of the rotor draws air into the pump through an inlet and discharges a mixture of air and liquid from the pump through an outlet.

In order to separate the air from the liquid it has been proposed hitherto to provide a separator adjacent the vacuum pump into which the mixture from one or more outlets of the vacuum pump is introduced. It is conventional to utilize a floor mounted separator, but such a separator increases the floor space required for a vacuum pump and separator arrangement. To reduce that problem, it has also been proposed to utilize a separator having a generally horizontal cylindrical or rectangular body mounted at an overhead position relative to the vacuum pump. While such separators take up less floor space, the separation of gas and air is not carried out in a particularly efficient manner in such separators. For example, the mixture entering the separator through an inlet of smaller cross sectional area than the cross sectional area of the body may simply be directed at right angles against an opposing surface so that the mixture impinges directly thereon prior to the liquid falling to the bottom of the cylinder from whence it is drained. Such a method of separation is not particularly efficient and the separated gas can contain an undesirable quantity of liquid droplets resulting from the impinging action.

An object of the present invention is to provide an improved form of separator which can be used in an overhead position and which will separate gas from the liquid effectively.

SUMMARY OF THE INVENTION

According to one aspect of the invention there is provided a separator for separating gas from a liquid comprising a body which has a cylindrical internal surface having an axis arranged, in use, substantially horizontally, an inlet for a gas and liquid mixture, and respective outlets in the body for the liquid and gas, the inlet being arranged such that mixture from the inlet is directed substantially tangentially to the cylindrical internal surface, whereby the mixture will travel circumferentially around the cylindrical internal surface to cause the liquid and gas to separate by centrifugal action.

Such centrifugal action separates the gas from the liquid more effectively than separation which involves directly impinging the mixture against a surface. Also, by causing the liquid to travel circumferentially around the cylindrical interior there is minimum disturbance of the liquid flow, thereby minimizing the risk of liquid droplets mixing with the separated gas.

The inlet for the mixture preferably discharges the mixture in an upward direction, whereby the mixture can travel around an upper surface section of the cylindrical interior surface.

Once the liquid has travelled part way around the cylindrical interior, it is preferably received by catchment means which is positioned to direct the liquid toward the liquid outlet.

According to a second aspect of the invention there is provided a separator for separating liquid from a gas comprising a body which has a cylindrical internal surface having an axis arranged, in use, substantially horizontally, an inlet for introducing a gas and liquid mixture, and respective outlets in the body for the liquid and the gas, the mixture being introduced so as to travel from the inlet circumferentially around the internal surface, and catchment means being provided for catching the liquid travelling around the cylindrical internal surface after separation of the gas therefrom to direct the liquid toward its outlet.

Use of the catchment means is particularly advantageous in that it enables the liquid travelling around the cylindrical interior surface to be guided directly to its outlet so that the liquid leaves the separator quickly with minimum disturbance, thereby further minimizing the likelihood of liquid droplets mixing with the separated gas.

The catchment means is preferably in the form of a plate or sheet-like member extending axially of the body and having an elongate edge spaced from the cylindrical internal surface to define an elongate opening. In that way, liquid can travel through the opening and from thence to the outlet, the opening having a radial depth greater than the radial depth of the liquid travelling around the cylindrical interior surface. The catchment means may be positioned more than 180° away from the mixture inlet in the direction of movement of the liquid around the cylindrical internal surface so that as much gas as possible is separated from the liquid prior to the liquid passing through the opening.

The gas outlet is preferably offset from the mixture inlet in the axial direction of the body. Such an arrangement helps to ensure that the liquid travelling around the cylindrical internal surface does not flow to the gas outlet.

To constrain the incoming mixture to take a path around the cylindrical internal surface in the circumferential direction, diverter means may be provided such as a plate extending partly across the inlet.

Guide means, e.g., in the form of a sheet or plate extending downwardly away from an upper surface section of the cylindrical internal surface, may be arranged to inhibit travel of the liquid axially of the body toward the gas outlet. The guide means may be provided with a gully at or toward a lower edge thereof for receiving liquid which may collect on the guide means. Preferably, the gully has an open end from which the liquid can leave the gully and run to the liquid outlet. In that respect, the open end of the gully is preferably arranged adjacent the aforesaid elongate opening.

Certain liquid ring vacuum pumps are provided with two outlets for mixture. In such a case, the separator may include respective inlets for connecting to the outlets of the liquid ring vacuum pump, the inlets preferably being arranged toward opposite ends of a common body. In such a case, a single gas outlet may be provided, and an interior divider may also be provided which divides the body interior into first and second chambers for receiving the mixture from the respective inlets. Such a divider may be positioned so as to provide two outlet paths to the gas outlet, one from the first chamber and the other from the second chamber.

BRIEF DESCRIPTION OF THE DRAWINGS

A separator in accordance with the invention will now be described by way of example with reference to the accompanying drawings in which:

FIG. 3 is an elevation of the separator shown in FIG. 2.

FIG. 4 is an end view of the separator shown in FIG. 3.

FIG. 10 is an elevation of a guide member.

FIG. 11 is an end view of the guide member shown in FIG. 10.

FIGS. 12 to 15 are cross-sections through the separator shown in FIG. 3 on the lines XII—XII, XIII—XIII, XIV—XIV, and XV—XV, respectively, in FIG. 3.

DETAILED DESCRIPTION OF THE PREFERRED EMBODIMENTS

Figure 1:
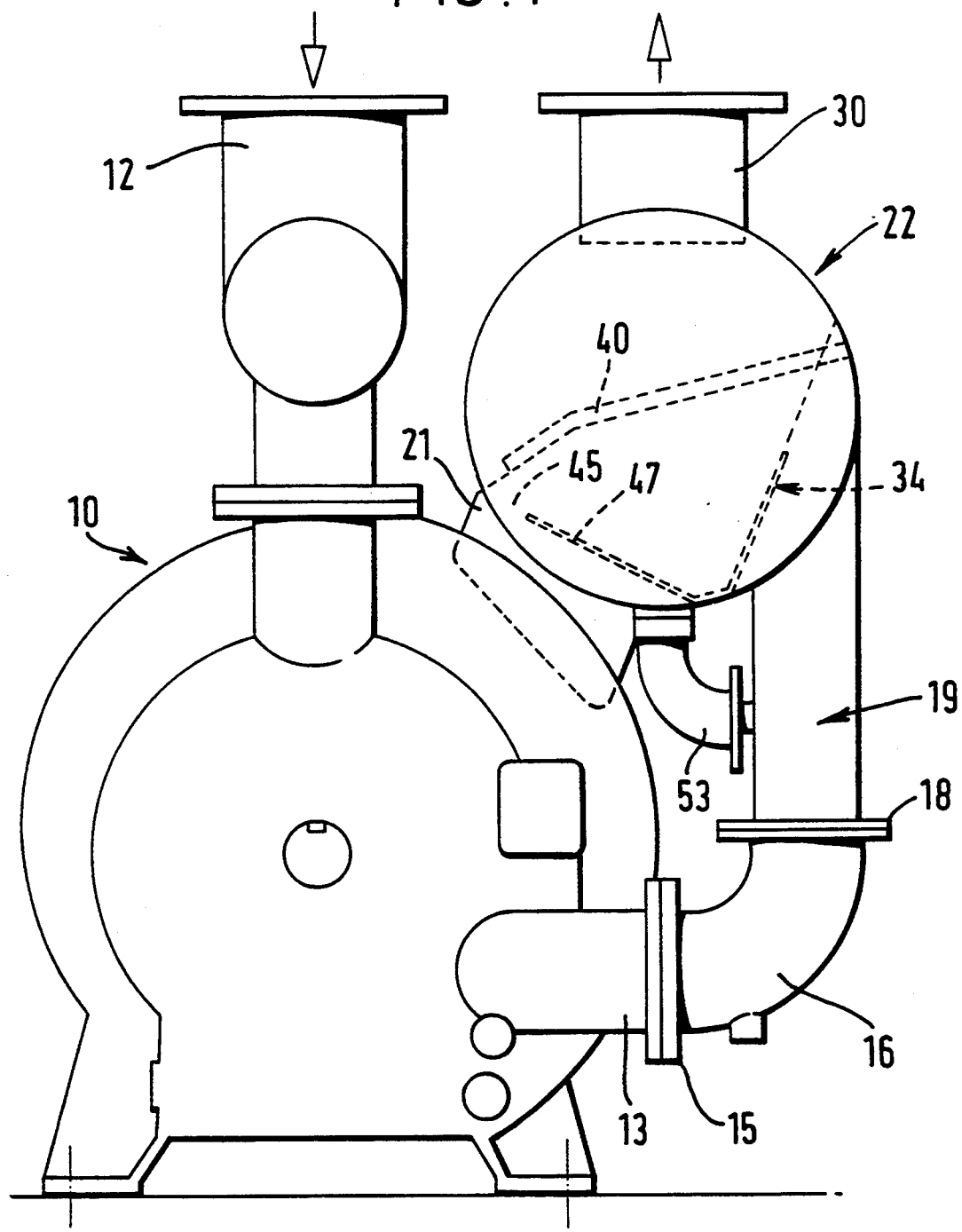
FIG. 1 is an end elevation of a separator in accordance with the invention mounted on outlets of a liquid ring vacuum pump.

Referring to FIGS. 1 to 5, a liquid ring vacuum pump 10 is of a known kind and has a gas inlet 12 and two gas and air mixture outlets 13, 14. The pump 10 also has a liquid inlet (not shown).

The outlets 13, 14 are connected to flanges 15 of elbows 16 which are themselves connected to flanges 18 of two mixture inlets 19, 20 of a separator 22 for separating gas from the liquid. The separator 22 is mounted on the pump 10 by means of brackets 21.

Figure 6:
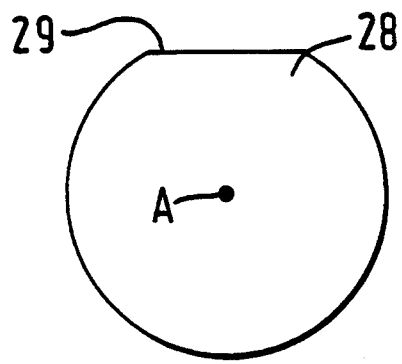
FIG. 6 is an elevation of a central divider for the separator.

The separator comprises a body 23 having a cylindrical inner surface 24 and end closures 25. The interior of the body 23 is divided into first and second chambers 26 and 27 by means of a circular divider or baffle 28 (FIG. 6) which has a flat upper edge 29. The baffle 28 is arranged immediately beneath an outlet 30 for the gas and effectively defines two paths 32, 33 (FIG. 5) for gas to the outlet 30 from the respective chambers 26, 27.

Figure 7:
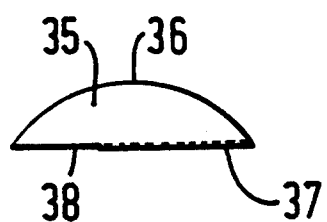
FIG. 7 is an elevation of a diverter.
Figure 8:
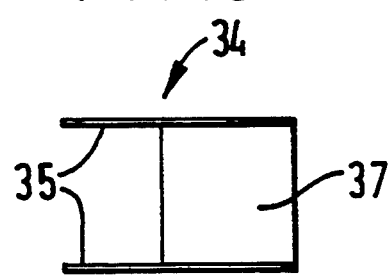
FIGS. 8 and 9 are plan and end views, respectively, of the diverter shown in FIG. 7.
Figure 9:
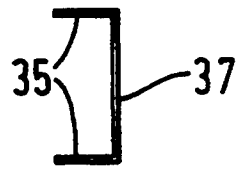

The inlets 19, 20 are spaced from the axis A of the body 23 and are arranged tangentially to the cylindrical internal surface 24. In that way, mixture entering the chambers 26, 27 does so substantially tangentially to the cylindrical internal surface. In order to assist such tangential flow, each of the chambers 26, 27 is provided with an inlet diverter 34 (FIGS. 7-9) comprising a pair of segment-shaped plates 35 having a curved edge 36, corresponding in curvature to the cylindrical internal surface 24, and a bridging plate 37 between flat edges 38 of the plates 35. The curved edges 36 are secured to the cylindrical internal surface 24 so as to lie one each side of the associated inlet and with the bridging plate 37 extending part way across the inlet. Any incoming mixture which comes into contact with the bridging plate 37 is diverted so as to flow substantially tangentially to the cylindrical internal surface 24.

Figure 2:
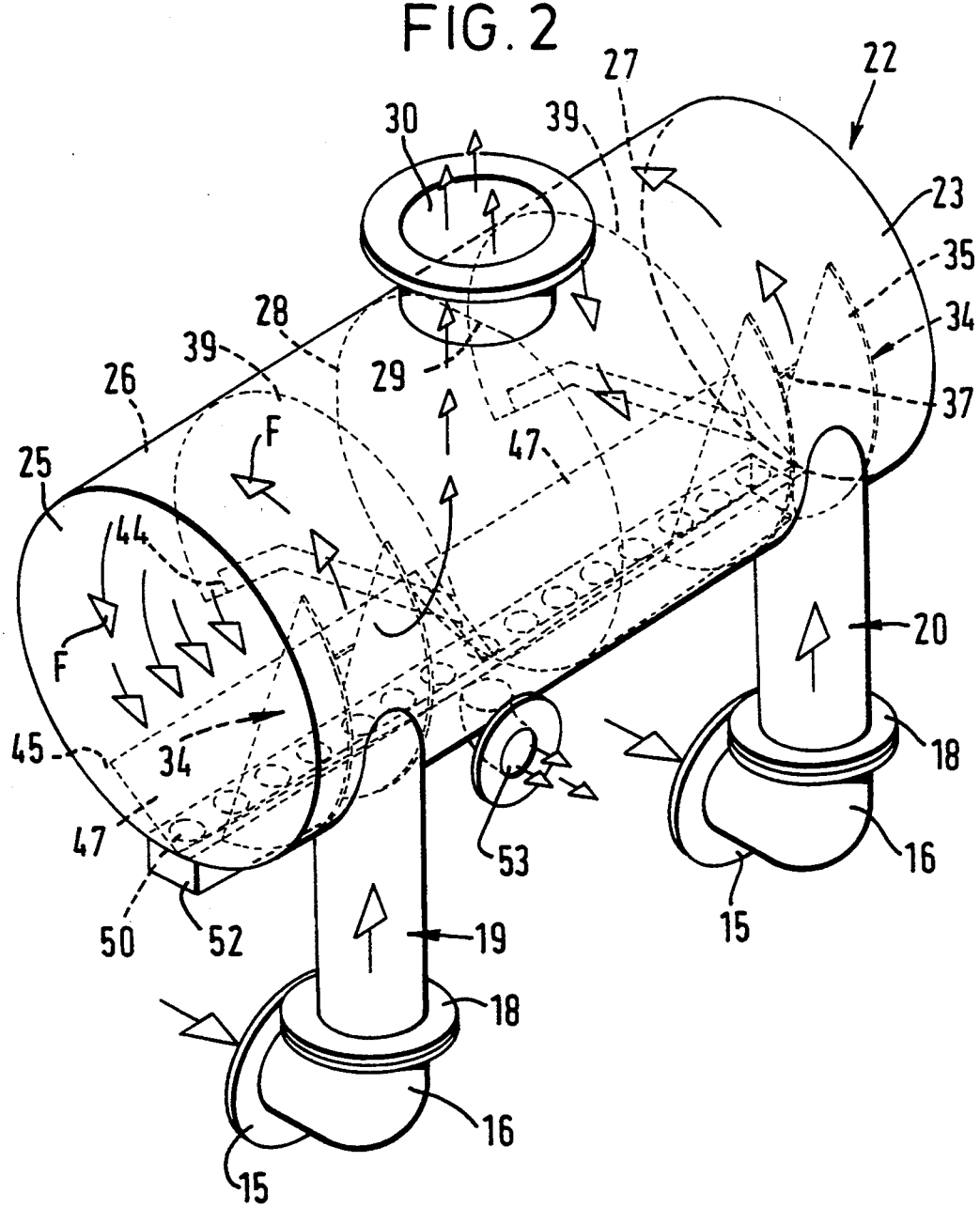
FIG. 2 is a perspective view of the separator shown in FIG. 1 detached from the liquid ring vacuum pump.
Figure 5:
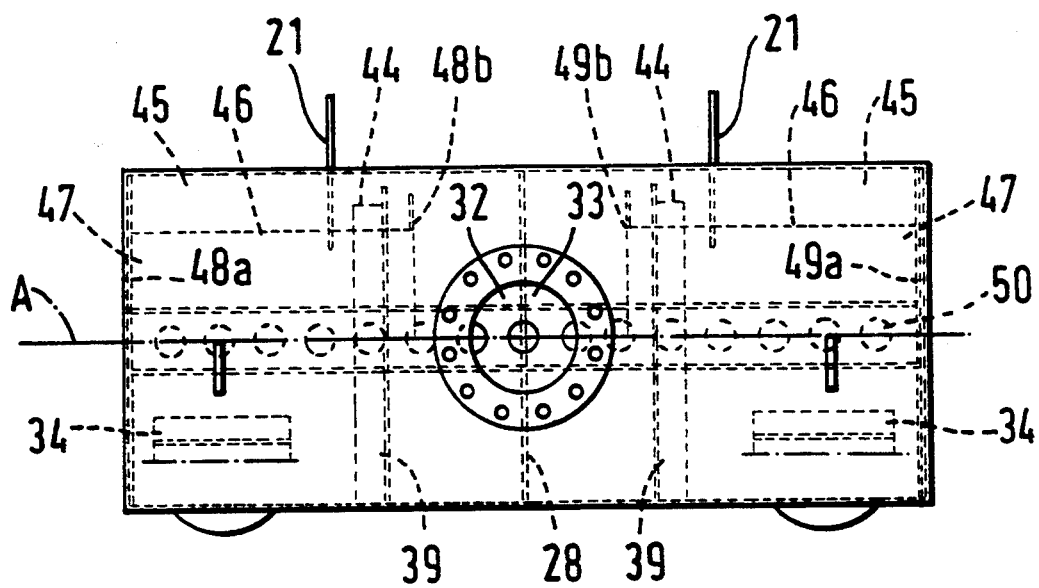
FIG. 5 is a plan view of the separator shown in FIG. 3.

Because of the high velocity of the incoming mixture (for example, 6000 feet (1830 meters) per minute in the inlets 19, 20), the mixture travels around the surface 24 as indicated by the arrows F in FIGS. 2 and 4. As the liquid is heavier than the gas, the centrifugal action causes the liquid to be urged against the cylindrical internal surface 24, whereby the gas and liquid separate.

The mixture is prevented from travelling axially along the internal cylindrical surface 24 to the gas outlet 30 by two guide plates 39 (FIGS. 10 and 11) arranged one in each chamber 26, 27. Each of the guide plates 39 is formed with a gully 40 at its lower end as viewed in the drawings. As shown in FIG. 11 the gully 40 is formed simply by bending lower edge sections 42, 43 upwardly.

The lower end of the gully 40 as indicated at 44 is positioned adjacent the cylindrical inner surface 24 opposite the inlet of the associated chamber and directly above an entry slot 45 defined between the wall 24 and the upper edge 46 of a catchment plate 47. Catchment plates 47 are provided for the respective chambers 26, 27 and, as shown in FIGS. 12 to 15, are mounted at their ends on respective segment-shaped plates 48a, 48b and 49a, 49b, respectively. The plates are suitably secured to the surface 24 and hold their catchment plates 47 with the upper edge 46 spaced from the surface 24 to define opening 45 and the lower edge of the plate in contact therewith. The lower edge of each catchment plate 47 is positioned adjacent a series of drainage apertures 50 which communicate with a drainage channel 52 under the body 23 leading to a liquid outlet 53.

The liquid travelling around the cylindrical internal surface 24 finally enters the slot 45 (for example, at a speed of around 900 feet (275 meters) per minute), and each catchment plate constrains the liquid to enter the drainage apertures 50. The opening 45 is positioned more than 180° from its associated inlet 19, 20 in the direction of liquid flow indicated by arrows F in FIGS. 2 and 4. The opening 45 has a greater radial depth D than the radial depth d of the liquid L travelling around the cylindrical internal surface 24 (see FIG. 13).

Liquid coming into contact with the guide plates 39 will tend to run down the side of the plate by gravity and into the gully 40, the liquid finally leaving the lower end of the gully 44 and running directly into the slot 45.

Gas separated from the liquid passes toward the outlet 30 at a speed, e.g., of 400/500 feet (122/152 meters) per minute. The gas flows beneath the guide plates 39 and leaves the chambers 26, 27 via the paths 32, 33 and the gas outlet 30.

It will be appreciated that the separation of the gas from the liquid depends upon the kinetic energy and centrifugal effect of the liquid following the circular path about the horizontal axis A of the body as it moves around the cylindrical internal surface. The gas is separated quickly and effectively as the liquid travels around the body and leaves the same with minimum disturbance and noise. The separator shown has been found to give good separation efficiency with gas velocities within the body up to around 400 ft (122 meters) per minute. Conventional separators of a similar size provide a less efficient separation at such speeds, leaving an undesirable quantity of liquid droplets in the gas which leaves the separator.

When using a liquid ring pump, it is known that "slugs" of liquid can occasionally enter the pump through the gas inlet. That liquid discharged in addition to the normal seal liquid suddenly increases the separation requirement and a separator in accordance with the present invention is effective in dealing with such increases so as to maintain efficient separation of the gas from the liquid.

The internal diameter of the body (e.g., 800 mm) is made significantly larger than that of the inlet ducts 19 (e.g., 200 mm) so that the velocity of the gas flow is reduced somewhat after leaving the inlets 19, 20 to assist in separation of the gas from the liquid. The liquid flowing from the outlet 53 can be returned to the vacuum pump 10 for subsequent use therein.

The invention claimed is:

1. A separator for separating liquid from a gas comprising a body which has a cylindrical internal surface having a longitudinal axis arranged in use substantially horizontally, two inlets for a gas and liquid mixture, said inlets being spaced from one another in the direction of said longitudinal axis, and respective outlets in said body for the liquid and gas, the inlets being arranged so that the mixture leaving each inlet is directed substantially opposing the force of gravity and substantially tangentially to the internal surface, whereby incoming mixture travels circumferentially around the surface to cause the liquid and gas to separate by centrifugal action, and catchment means provided which catches the liquid travelling around the cylindrical internal surface after separation of gas therefrom so as to direct the liquid toward the liquid outlet.

2. A separator according to claim 1 in which each inlet for the mixture discharges the mixture in a direction opposing the force of gravity so that the mixture travels around an upper surface section of the cylindrical internal surface to effect separation of the liquid from the gas.

3. A separator according to claim 1 in which the catchment means comprises a plate or sheet-like member extending in the direction of the longitudinal axis of the body and having an edge spaced from the cylindrical internal surface to define an opening through which liquid can travel to the liquid outlet.

4. A separator according to claim 3 in which the opening has a radial depth greater than the radial depth of the liquid travelling around the cylindrical interior surface.

5. A separator according to claim 1 in which the catchment means is positioned more than 180° from the mixture inlets in the direction of movement of the liquid around the cylindrical internal surface.

6. A separator according to claim 1 in which the gas outlet is offset from the mixture inlets in the direction of the longitudinal axis of the body.

7. A separator according to claim 1 in which diverter means is provided adjacent each mixture inlet for constraining the incoming mixture to take a path around the cylindrical internal surface in the circumferential direction.

8. A separator according to claim 7 in which the diverter means includes a plate mounted on the internal cylindrical surface and extending partly across each inlet transverse to the direction of mixture flow through the inlet.

9. A separator according to claim 1 in which guide means is provided which inhibits travel of the liquid in the direction of the longitudinal axis of the body toward the gas outlet.

10. A separator according to claim 9 in which the guide means extends substantially in the direction of the force of gravity away from an upper surface section of the cylindrical internal surface.

11. A separator according to claim 10 in which the guide means is provided with a gully at or toward a lower edge thereof for receiving liquid which may collect on the guide means.

12. A separator according to claim 11 in which the gully has an open end from which the liquid can leave the gully and pass to the liquid outlet.

13. A separator according to claim 1 in which the outlet for the liquid is positioned in a lower portion of the cylindrical surface of the body.

14. A separator according to claim 1 in which the gas outlet is positioned in an upper portion of the cylindrical surface of the body.

15. A separator according to claim 1 in which the two inlets are both positioned in a single plane which is tangent to said internal surface.

16. A separator according to claim 1 in which a divider is provided which divides the interior of the body into first and second chambers which receive the mixture from the respective inlets.

17. A separator according to claim 16 in which the divider is positioned so as to provide two outlet paths to the gas outlet, one from the first chamber and the other from the second chamber.

18. A separator for separating liquid from a gas comprising a body which has a cylindrical internal surface having a longitudinal axis arranged in use substantially horizontally, two inlets for introducing a gas and liquid mixture, said inlets being spaced from one another in the direction of said longitudinal axis, and respective outlets in the body for the liquid and gas, the mixture being introduced above a lower portion of the cylindrical internal surface so as to travel from each inlet circumferentially around an upper portion of the cylindrical internal surface, and catchment means being provided for catching the liquid travelling around the cylindrical internal surface after separation of gas therefrom to direct the liquid toward the liquid outlet, said catchment means having a catchment plate arranged so that one edge of said plate is in contact with the lower portion of the cylindrical internal surface in the direction of the longitudinal axis of the separator and said plate being oriented inside the separator to create a horizontal opening defined by a space between a second opposing edge of said plate and above the outlet for the liquid.

* * * * *